United States Patent

[11] 3,575,319

[72] Inventor Albert Safianoff
 Palos Verdes Peninsula, Calif.
[21] Appl. No. 744,064
[22] Filed July 11, 1968
[45] Patented Apr. 20, 1971
[73] Assignee The Upjohn Company
 Kalamazoo, Mich.

[54] PORTABLE DISPENSER FOR POLYMER FOAMS
 4 Claims, 5 Drawing Figs.
[52] U.S. Cl. .................................................. 222/135,
 222/145, 222/459, 222/473, 239/304, 239/427
[51] Int. Cl. ..................................................... B05b 1/04
[50] Field of Search ........................................ 222/135,
 145, 459, 473; 239/304, 427, 432, 418

[56] References Cited
 UNITED STATES PATENTS

| | | | |
|---|---|---|---|
| 2,868,421 | 1/1959 | Schott ......................... | 222/473 |
| 3,236,457 | 2/1966 | Kennedy et al. .............. | 239/418X |
| 3,303,970 | 2/1967 | Breslau et al. ................ | 239/304 |
| 3,416,709 | 12/1968 | Shultz et al. .................. | 222/145X |
| 3,451,593 | 6/1969 | Dillarstone .................... | 222/145X |

Primary Examiner—Robert B. Reeves
Assistant Examiner—Frederick R. Handren
Attorneys—Eugene O. Retter and Denis A. Firth ABSTRACT: A portable dispenser for polymer foam reaction mixtures is provided. The dispenser comprises a supporting frame with handle. Mounted on the supporting frame are two or more aerosol containers in which are stored, under pressure, the various components which, when brought together, give rise to the polymer foam reaction. Each container is provided with a valve. The valves on all containers can be actuated simultaneously by a trigger device mounted in the supporting frame. The fluids released from the individual containers are conducted separately through short conduits to a mixing chamber located in one end of a tubular dispensing nozzle. A stationary baffle, preferably comprising a series of discs having peripheral apertures permitting constricted passage of fluid on a tortuous path, is disposed in the tubular nozzle between the mixing chamber and the exit port. The baffle ensures adequate mixing of the reaction components prior to dispensing of the reaction mixture from the exit port. The mixing chamber and baffle are readily removable for cleaning and the aerosol containers are detachably mounted for easy replacement. The portable dispenser is particularly suited for dispensing polyurethane foam reaction mixtures.

PATENTED APR 20 1971 3,575,319

ALBERT SAFIANOFF
INVENTOR.

BY Denis A. Leth
AGENT

ALBERT SAFIANOFF
INVENTOR.

PORTABLE DISPENSER FOR POLYMER FOAMS

BACKGROUND OF THE INVENTION

1. Field of the Invention

This invention relates to a portable apparatus for the dispensing of polymer foam reaction mixtures and is more particularly concerned with a portable aerosol foam reaction component mixer and dispenser having readily replaceable storage containers and readily cleaned dispensing nozzles.

2. Description of the Prior Art

A number of devices have been described capable of storing reactive components under pressure and of mixing and dispensing the mixture upon demand; see, for example, U.S. Pat. Nos. 2,973,833, 2,876,935, 2,941,696, 3,191,808, and 3,181,737. Such devices can be adapted to the storage, mixing, and dispensing of relatively small quantities of polymer foam reaction mixes such as polyurethane foam mixes. However, the devices hitherto available are generally of the "single use" variety, i.e. after discharge of the contents the whole package is thrown away and is not capable of reuse. Further, in many of said devices it is not possible to obtain intermittent dispensing of the polymer foam reaction mixture because the method adopted to mix the components has been irreversible. Even when the mixing is not the controlling factor, intermittent dispensing is frequently not possible because foam reaction mixture remaining in the conduits and mixing chamber of the dispensing device, after the first discharge of material, undergoes polymerization. The passageways within the dispensing device are thereby blocked and further dispensing of foam reaction mixture is prohibited. Mixing chambers and dispensing nozzles which are detachable for solvent cleaning have been suggested to overcome this problem; see, for example, U.S. Pat. No. 2,973,883, supra. Even so, the devices of this kind have generally not been reusable after the aerosol component containers have once been emptied.

U.S. Pat. No. 3,178,157 describes a portable dispensing device in which the component containers can be replaced or can be recharged. However, the component containers in said device are not readily replaceable since it is necessary to disconnect flanges and seals in order to do so. Further, the method of storage of components within the containers is not simple. The components are stored in flexible polyethylene bags within the separate containers and the space between the outside of the flexible bags and the inside wall of the containers is filled with a fluid to which pressure is applied when the foam components are to be dispensed.

I have now found that a simple, portable, mixing and dispensing apparatus, having readily replaceable component containers and adapted for intermittent dispensing of polymer foam, can be prepared readily from simple components.

SUMMARY OF THE INVENTION

My invention, in its broadest aspect, comprises a portable apparatus for mixing and dispensing polymer foam reaction mixture which comprises in combination:

i. a lightweight housing provided with carrying handle;
ii. a plurality of storage containers having stored therein under pressure the components for a polymer foam reaction mixture said containers each being detachably mounted in said housing;
iii. valve means mounted on each of said storage containers for releasing the contents thereof;
iv. trigger means for simultaneously actuating each of said valve means to dispense said reaction components in predetermined proportions;
v. conduit means for separately conducting each of the components dispensed under pressure from said storage containers to a common mixing chamber;
vi. an exit port for dispensing said mixed components; and
vii. baffle means disposed between said common mixing chamber and said exit port.

DETAILED DESCRIPTION OF THE INVENTION

Figure 3:
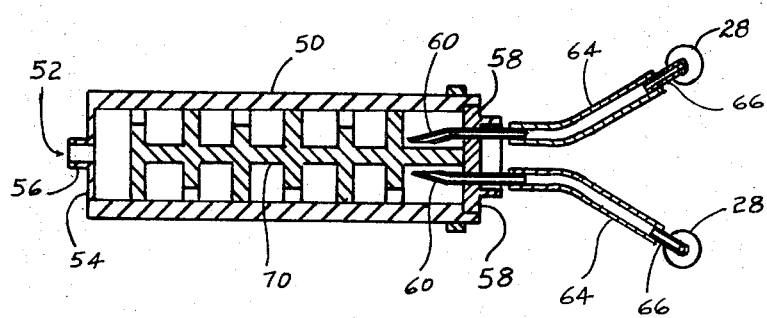
FIG. 3 is a partial cross-sectional view of the specific embodiment shown in FIG. 1 taken in the plane A-A.

The portable dispensing apparatus of this invention is characterized by simplicity of construction and operation. In general, the device of the invention comprises a framelike housing which is adapted to hold the various components of the device in the spatial relationship necessary for successful operation. In its simplest form the frame housing comprises a flat member having a handle attached to one of its longer sides. Said flat member is provided with means for detachably engaging two or more pressurized cans which hold the various components necessary to prepare the polymer foam mix. Conventional one-component aerosol cans having any desired capacity can be employed for this purpose. Such cans normally have a rounded flange surrounding the valve housing in the top of the can.

A convenient manner of mounting such aerosol cans detachably on said flat member of the frame housing is to provide spring clips on the edges of said frame member which will engage that portion of the aerosol container immediately below the flange of the valve housing. Alternatively, the flat member of the frame housing can be provided with cutout portions the diameter of each of which corresponds to the diameter of that portion of the aerosol can immediately below the aforesaid flange around the valve housing. Said cutout portions of said flat member are provided with throats into which the top of each aerosol container can be thrust. If the flat member of the frame housing is constructed from material having reasonable resiliency such as lightweight aluminum, polypropylene and the like, the aforesaid cutout members with throats will act as spring clips and permit the aerosol cans to be slipped into place, held sufficiently securely to enable the apparatus to be operated, and yet be readily detachable for replacement.

The required number of aerosol containers is generally held on said flat member of the frame housing in symmetrical relationship one to the other and with the valve members oriented in the same plane. Said plane is preferably parallel, and closely adjacent, to the surface of the flat member.

A discharge nozzle is also located on the flat member of the frame housing in a central position with respect to the valve members of each of said aerosol cans. The discharge nozzle is held securely on said flat member of the frame housing, generally by providing a suitable depression on the flat member to receive one end of the discharge nozzle. The discharge nozzle is held in place on the frame member by any suitable means, for example, by a spring clip. The discharge nozzle is provided, at its end nearest to the valve members of the various aerosol cans, with entry ports. The number of entry ports corresponds to the number of aerosol containers mounted on said frame member. Leading from each valve member of the aerosol cans is a conduit which connects said valve with one of the entry ports on said discharge nozzle. The conduit means is advantageously constructed of any flexible material inert to the reactants. Examples of such materials are nylon, polyethylene, rubber, and the like.

The interior of the discharge nozzle immediately adjacent said entry ports is hollow and forms a mixing chamber to which all the individual foam reaction components are conducted via said entry ports and are allowed to mix. Immediately beyond the mixing chamber in said discharge nozzle there is mounted a baffle means which serves to effect thorough mixing of the various components of the foam reaction mixture before the latter is discharged from an exit port at the far end of the discharge nozzle.

Said baffle means can be constructed in any convenient manner provided that the path which the foam reaction mix is caused to follow is tortuous and ensures thorough mixing of the reaction components before discharge of the resulting mixture from the exit port.

The mixing and dispensing device of the invention is actuated by means of a trigger mechanism mounted in the frame housing. Said trigger mechanism is mounted pivotally in the frame housing and is attached to, or is integral with, a bar or like member which straddles the various valve means on said aerosol containers. The trigger means is actuated by being squeezed manually against the handle on the frame housing thereby depressing the bar or like means straddling each of said valve means on the aerosol containers. Activation of said valve means in this way discharges material simultaneously from each of the aerosol containers, the contents of the latter being discharged by propellant gases which are held under pressure in said aerosol containers. Alternatively, but less preferably, the propellant gas can be stored in a separate container from which it is released into the various component containers as required, the means for releasing the propellant gas into the component containers being actuated simultaneously with the means for discharging the contents of the component containers. The materials so released from the various aerosol containers are brought together in the mixing chamber at the inner end of the discharge nozzle, subjected to mixing while passing through the baffle means, and are discharged from the exit port at the outward end of the discharge nozzle.

The dispensing device of the invention can be employed to discharge any conventional cellular foam reaction mixture in which the components interact at ambient temperatures after having been brought together. For example, the dispensing device of the invention can be employed to dispense polyurethane foam forming mixtures. Such mixtures generally comprise at least two reaction components which are brought together at the required time to form the foam reaction mix. One of said reaction components comprises a polyisocyanate such as polymethylene polyphenyl polyisocyanate, toluene diisocyanate (generally a mixture of the 2,4-and 2,6-toluene diisocyanates) and the like. The second component generally comprises a mixture of a polyol, a catalyst for the reaction between the isocyanate groups of the polyisocyanate and the active hydrogen-containing groups of said polyol, as well as surfactants and other optional additives. In some cases a third component is employed which comprises a fire retardant material not stable on storage with either the polyisocyanate or the polyol component. The various components of these reaction mixtures are stored in the various aerosol containers of the device of the invention in association with the propellant gas conventionally employed in the art. If desired, the gas used as propellant can also be used as blowing agent in the cellular foam mix to be generated. Alternatively, the appropriate amount of water can be added to the polyol component to serve as blowing agent by reaction with the polyisocyanate to produce carbon dioxide in accordance with procedures well known in the art. For a detailed discussion of procedures and components for the preparation of polyurethane foams see, for example, Saunders et al., Polyurethanes, Chemistry and Technology, Part II, 1964, Interscience, New York.

The various components of the polyurethane foam forming mixture are dispensed in the appropriate proportions in accordance with conventional requirements in the polyurethane foam forming art. The relative rate and proportions in which said components are dispensed can be adjusted in one or more of a number of ways. For example, the pressure under which the various components are packed in said aerosol containers can be varied in an appropriate manner. Alternatively, the diameters of the orifices in the individual valve means on the aerosol containers can be adjusted to allow dispensing of the component in the required proportion. Other means of adjusting the rate at which the various components are dispensed will be obvious to one skilled in the art.

The dispensing device of the invention can be employed for intermittent production and discharge of polymer foam mixture. When there is to be a substantial interval between the times of discharge of quantities of foam, the discharge nozzle and the flexible conduits leading from the valve means to the discharge nozzle and the valve nozzles themselves, can all be readily disconnected and cleaned of any residual polymer foam reaction mixture by simple washing with solvents and the like. Alternately, since all components are simple friction fits, complete dismantling and washing by immersion in solvents may be done conveniently. When the contents of one or more of the aerosol component containers has been completely discharged, a replacement for that container can be readily inserted in place of the empty container without the need to dismantle the whole apparatus. These and other advantages in the device of this present invention especially its light weight and compactness will be obvious to one skilled in the art and will become even more apparent when consideration is given to the various specific embodiments which will now be discussed in detail.

Figure 1:
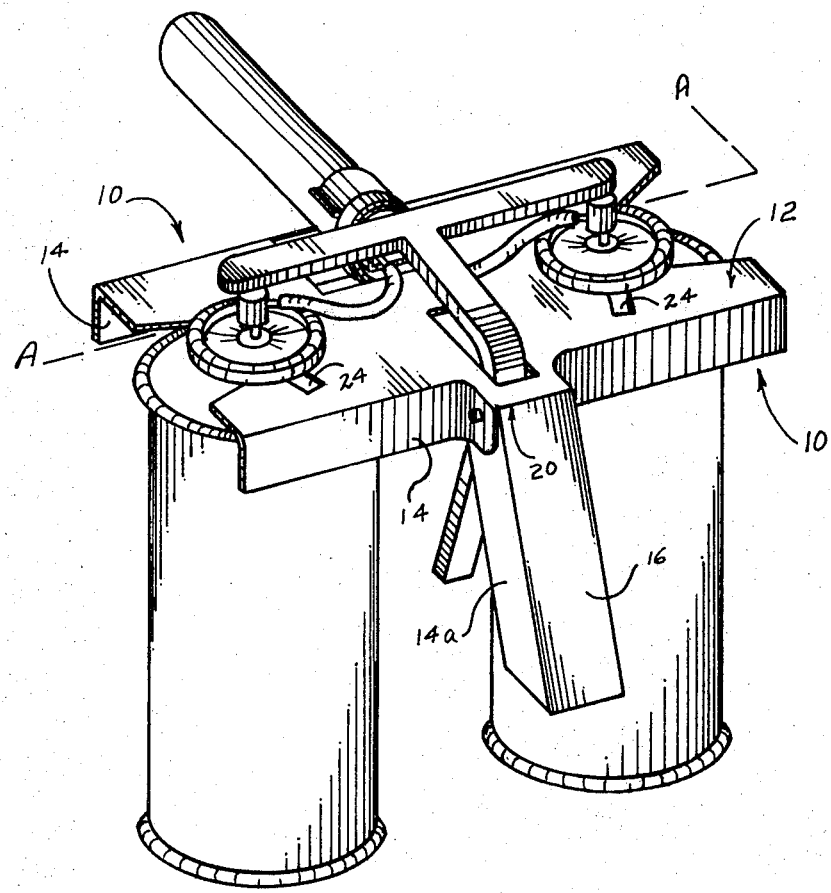
FIG. 1 is a perspective view of a specific embodiment of a portable dispensing device in accordance with the invention.
Figure 2:
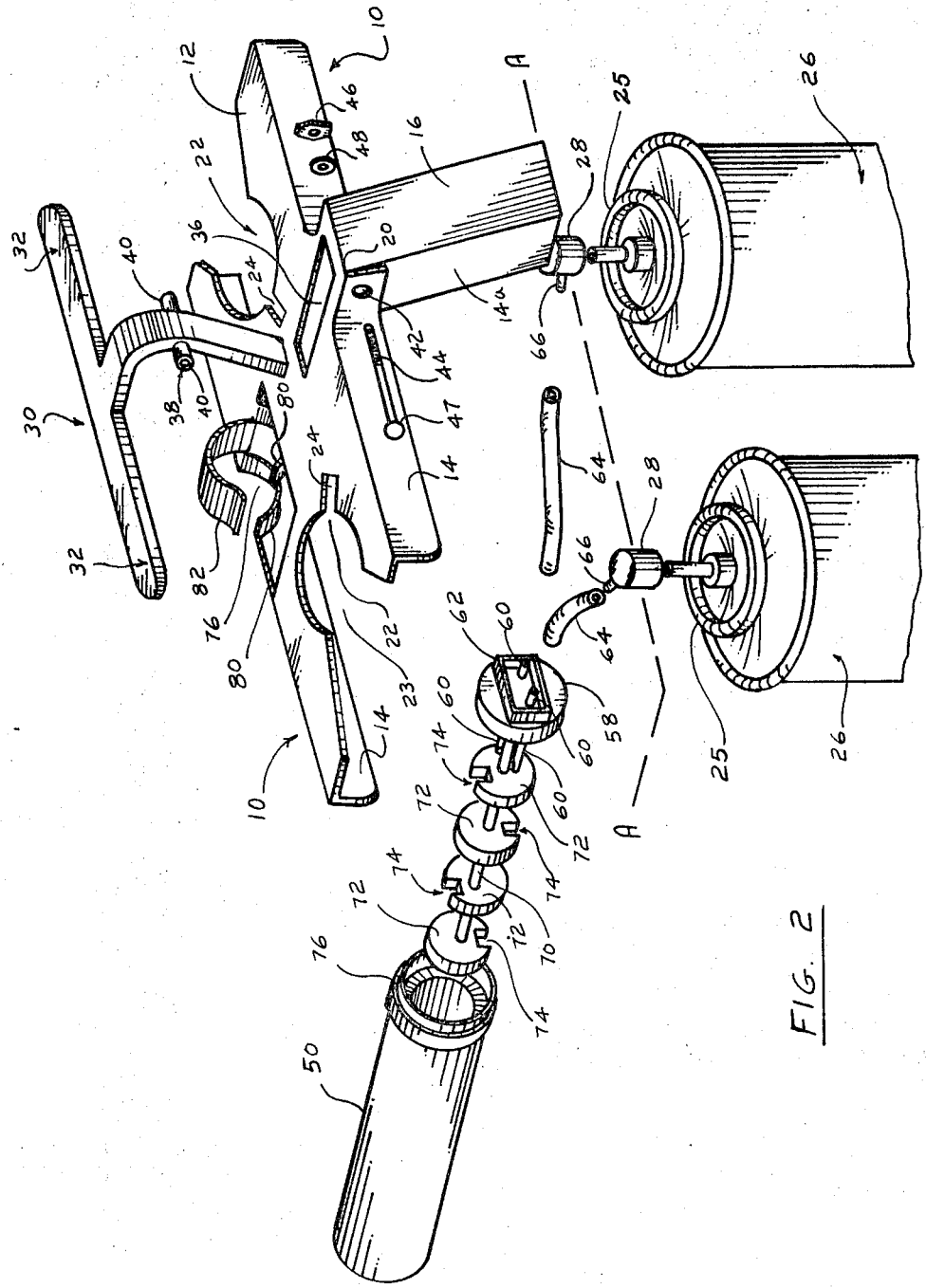
FIG. 2 is an exploded perspective view of the specific embodiment shown in FIG. 1 of a portable dispensing device in accordance with the invention.
Figure 4:
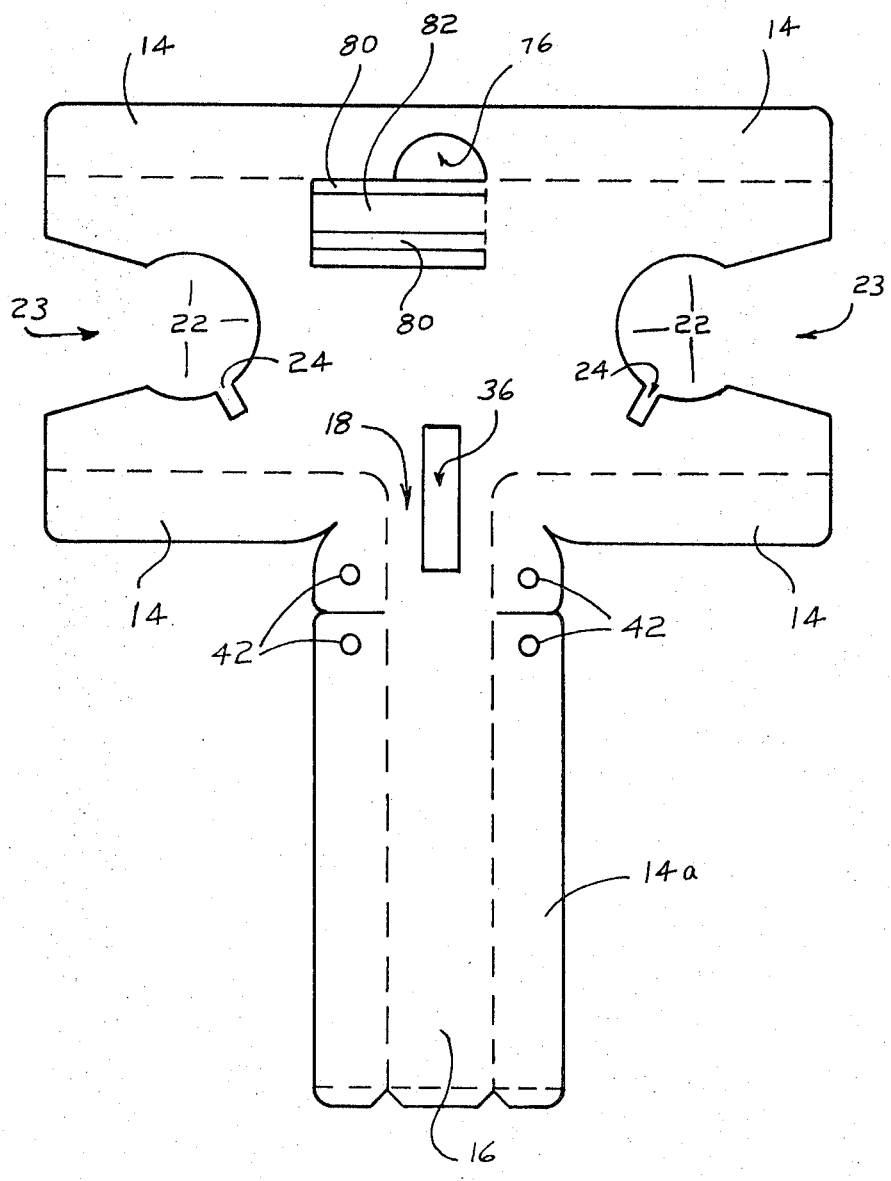
FIG. 4 is a plan view of a cutout blank for forming the frame housing and handle of the specific embodiment shown in FIGS. 1 and 2.

In FIGS. 1 and 2 there is shown a specific embodiment of the invention adapted for use with two component polymer foam systems. A perspective view of the completely assembled embodiment is shown in FIG. 1 while an exploded perspective view of the same embodiment is shown in FIG. 2. In said embodiment the frame housing member 10 takes the form of a sheet 12 having parallel flanges 14 along its longest edges. Said sheet 12 is approximately rectangular in configuration (making due allowance for the various cutout portions). Said sheet 12, with flanges 14, is provided with a handle 16 which subtends from the approximate center of one of the long sides of said sheet 12 and is integral with the projection 18 on said side of said sheet 12. That portion of the frame housing 10 which is represented by the sheet 12, the flanges 14, the projection 18, and the handle 16 with flanges 14a on said handle, can be prepared from a single flat sheet of material such as lightweight steel, aluminum, polypropylene, and the like by cutting out the appropriate sheet of material, forming the flanges 14 and 14a thereon, and bending the handle 16 about the line 20. In FIG. 4, there is shown, in plain view, a cutout blank from which the frame housing 10 can be prepared by pressing and diecutting or like forming operation.

The sheet member 12 is provided with two substantially hemispherical cutout sections 22 having throats 23. The cutout sections 22 serve to hold two aerosol containers 26 in detachable engagement with the frame housing 10. The mounting of the container 26 is accomplished by bringing the flange 25 on the container 26 into alignment with the throat 23 and sliding the container 26 into place so that the lower edge of the flange 25 overrides the upper edge of the cutout portion 22 on the sheet 12. The diameter of the cutout portion 22 is smaller than the diameter of the widest portion of the flange 25 but larger than the diameter of the underside of said flange 25. The width of the throat 23 is slightly smaller than the diameter of the underside of the flange 25 so that a positive pressure has to be applied to the container 26 in order to snap the latter into place in the cutout portion 22 of the housing 10. The amount of constriction provided at the throat 23 will, obviously, depend on the degree of elasticity in the material from which the frame housing 10 is formed. To assist in imparting spring action to the assembly formed by the throat 23 and cutout portions 22, the latter are provided with radially disposed slits 24.

The manner described above for the attachment of the aerosol container 26 to the housing 10 in the specific embodiment of FIGS. 1 and 2 enables said container 26 to be held in such a manner that it is not displaced downwardly from said housing 10 upon actuation of the valve 28 on said aerosol container 26. However, the latter is capable of being detached readily from the housing 10 by reversing the steps which were carried out in order to secure the container to the housing.

The trigger mechanism of the embodiment shown in FIGS. 1 and 2 takes the form of a T-shaped member 30 having a crossbar 32 and a curved member 34. Said trigger mechanism 30 is pivotally mounted in the frame housing 10 with the crossbar 32 above the plane of the sheet 12 and the tail of the curved member 34 passing through the rectangular opening 36 in said housing 10. The trigger mechanism 30 is aligned so that the cylindrical bore 38, which passes through the curved member 34 and the integral bearings 40 in a direction at right angles to the longitudinal dimension of said member 34, is in alignment with the holes 42 in the handle 16. Said trigger 30 is pivotally mounted in this position by the pin 44 which passes through the first hole 42, through the cylindrical bore 38 and thence through the second hole 42 on the other side of said handle. The pin 44 is prevented from passing completely through said holes and bore by the head 47 on said pin and is secured in place by means of a washer 48 and a retaining nut 46. When mounted in this position, the trigger 30 is so positioned that the underside of the extremities of the crossbar 32 are in resting engagement with the top of the valve members 28 on said aerosol containers 26 and the tip of the tail member 34 is positioned away from the inner side of the lower end of the handle 16. By appropriate manual operation, the lower end of the curved tail member 34 of the trigger 30 can be squeezed towards the handle 16 thereby causing the crossbar 32 to exert pressure simultaneously on each of the valve members 28 with which it is in engagement and releasing a portion of the contents of each of the two aerosol containers 26.

The discharge nozzle of the specific embodiment shown in FIGS. 1 and 2 comprises a hollow cylindrical barrel 50 having an exit port 52 mounted at one end thereof. Said exit port 52 takes the form of a spherical opening situated substantially in the center of the end wall 54 of the barrel member 50. In a preferred embodiment, a small cylindrical nozzle 56 is mounted on the outside of the end plate 54 and forms the outer end of the exit port 52. The location of this nozzle member 56 is shown in FIG. 3. The latter is a cross-sectional view of the discharge nozzle of the specific embodiment of FIGS. 1 and 2 taken along the plane A-A.

The end of the barrel member 50 remote from the exit port is closed by means of an end plate 58 which can be mounted in the end of said barrel 50 by any suitable means, for example, by providing interlocking threads on the outer edge of the end plate 58 and the corresponding inner face of the end of the barrel 50. Mounted on said end plate 58, and passing therethrough, are conduits 60. The ends of said conduits 60 which project outwardly from the end plate 58 are protected by a shield 62 mounted integrally on said end plate 58. The outer ends of said conduits 60 are connected by tubes 64 to the exit port 66 of the valve means 28 of the aerosol containers 26. Advantageously, the tubes 64 are made of flexible material such as nylon, polypropylene, or other flexible materials inert to the reactants, to facilitate the attachment and removal of said tubes to and from the end of conduits 60 and the ports 66.

Mounted within the discharge nozzle barrel 50 is baffle means 68. In the specific embodiment shown in FIGS. 1, 2, and 3 said baffle means comprises an axle 70 on which is mounted a series of baffle plates 72. Said baffle plates 72 are integral with said axle 70 and are mounted in a plane at right angles to the longitudinal axis of the axle 70. The baffle plates 72 are discs, the outside diameters of which are approximately the same as that of the inside diameter of the barrel 50. Each of said baffles 72 is provided with cutout portion 74 on the perimeter of said plate. In the specific embodiment of FIGS. 1, 2 and 3 said cutout portion 74 is approximately rectangular in shape but it will be appreciated that other configurations can be employed if desired. The exact depth and overall dimension of said cutout portion 74 can vary according to the amount of constriction specifically desired in any given instance in the baffle member 68. Each of the cutout portions 74 in said baffle plates 72 is aligned so that it has been turned through an angle of approximately 180° with respect to the position of the inserts in each of its neighbors.

The number of baffle plates mounted on said axle 70 can be varied according to the desired amount of mixing and constriction to be imparted to the foam reaction mixture passing through the barrel 50. In the particular embodiment shown in FIGS. 2 and 3 the baffle 68 is constructed by casting the baffle plates 72 and axle 70 in one piece, using plastic or like material, in a suitable mold. Other means of constructing said baffle member 68 will be apparent to one skilled in the art. For example, the baffle plates 72 can be held in place in the barrel member 50 by mounting spacing rings between said baffle plates and omitting the axle member 70 entirely.

The discharge barrel 50, with the baffle member 68 mounted therein, can be held in place on the frame housing 10 by mounting the end of the barrel remote from the exit port in the arcuate depression 76 in the frame housing 10. In the specific embodiment shown in FIG. 2 the barrel member 50 is provided with a flange 78 which engages a corresponding channel 80 in the depression 76. The barrel 50 is held in place on the frame housing 10 by means of the spring clip 82.

The device shown in FIGS. 1 and 2 is operated by manually squeezing the curved member 34 of the trigger 30 in the manner previously described thereby actuating the valve members 28 and discharging a portion of the contents of the pressurized containers 26. The materials so discharged from the containers 26 flow through the tubes 64 and the conduits 60 and are discharged therefrom into the mixing chamber at the end of the barrel 50. Thence, the materials flow through the baffle member 68 within the barrel 50 and, after mixing by passage through said baffle member 68, are discharged from the exit port 52 via the nozzle 56. If the device is operated intermittently and the intervals between use are such that residual polymer foam mix in the tubes 64, conduits 60, or baffle 68 would solidify during the nonoperational period, the discharge nozzle 50 with baffle 68, tubes 64, and valves 28 are detached from the remainder of the device and flushed with the appropriate solvent to remove the residual polymer foam mix. When one or other of the containers 26 is empty it is readily replaced by a full container in the manner describe above.

Figure 5:
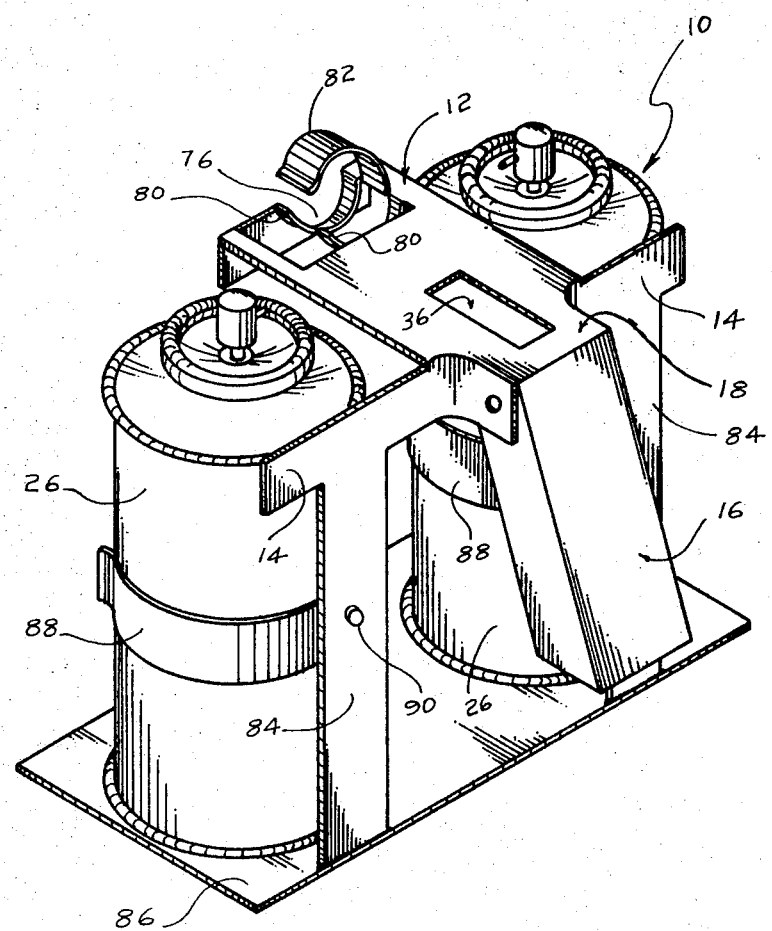
FIG. 5 is a partial perspective view of another specific embodiment of the frame housing of the device of the invention.

As will be appreciated by one skilled in the art, the particular mode of construction of the specific embodiment of the invention shown in FIGS. 1, 2, 3, and 4 can be varied in numerous ways without departing from the scope of the present invention. For example, the mode of attachment of the containers 26 can be varied subject only to the requirement that said containers be held, in the desired relationship to the discharge nozzle and the crossbar of the trigger, sufficiently rigidly to permit actuation of the valves on said containers via the crossbar of the trigger mechanism. Illustratively, said containers 26 can be supported at their bases using a lower platform as shown, for example, in the embodiments of FIG. 5. The latter shows, in perspective view, the relationship between the frame housing 10 and the containers 26, the remaining elements of the device of the invention being omitted for purposes of simplification. In said frame housing shown in FIG. 5 the sheet 12 is abbreviated to a strip of material projecting horizontally from the flange 14 on the back of the frame 10. The handle 16 subtends, as previously, from the projection 18 on the rear edge of the sheet 12. A base platform 86 is suspended from the flange 14 by brackets 84. The containers 26 are held on said base platform 86 by means of spring clips 88 which are attached to the midportion of the brackets 84 by rivets 90 or by other suitable means.

Similarly, the mode of construction of the various other components of the novel device of the invention can be varied without departing from the scope of the invention.

While the novel apparatus of the invention has been described above with reference to certain specific embodiments thereof, it is to be clearly understood that these embodiments have been given for purposes of illustration only and are not intended to be limiting. The scope of the invention is bounded only by the scope of the claims which are set out hereafter.

I claim:

1. A portable apparatus for mixing and dispensing a polymer foam reaction mixture which comprises in combination:
    i. frame housing for supporting the various elements of the apparatus in combination, said frame housing being provided with a carrying handle;
    ii. a plurality of storage containers having stored therein the components for a polymer foam reaction mixture, said containers each being detachably mounted in said frame housing;
    iii. valve means mounted on each of said storage containers for releasing the contents thereof;
    iv. trigger means for simultaneously actuating each of said valve means to dispense said reaction components in predetermined proportions;
    v. conduit means for separately conducting each of the components dispensed under pressure from said storage containers to a common mixing chamber;
    vi. an exit port for dispensing the mixed components; and
    vii. a baffle disposed between said common mixing chamber and said exit port said baffle comprising a plurality of discs mounted on a central axle, the faces of said discs being disposed substantially at right angles to the direction of the flow of the foam reaction mixture, said discs each having an aperture in the perimeter thereof to permit passage of foam reaction mixture therethrough.

2. A portable apparatus for mixing and dispensing a polymer foam reaction mixture according to claim 1 wherein the apertures in the discs of the baffle are so aligned that the foam reaction mixture is compelled to follow a tortuous path in passage through said baffle.

3. A portable apparatus for mixing and dispensing a polymer foam reaction mixture which comprises in combination:
    i. frame housing for supporting the various elements of the apparatus in combination, said frame housing being provided with a carrying handle;
    ii. a plurality of storage containers having stored therein under pressure the components for a polymer foam reaction mixture, said containers each being detachably mounted in said frame housing;
    iii. valve means mounted on each of said storage containers for releasing the contents thereof;
    iv. trigger means for simultaneously actuating each of said valve means to dispense said reaction components in predetermined proportions;
    v. tubes detachably mounted on the exit ports of each of said valve means, each of said tubes connecting the exit port of the valve means to which it is attached to a conduit leading to the interior of a common hollow mixing chamber located at the inner end of a discharge nozzle;
    vi. an exit port located in said discharge nozzle at the end of the latter remote from the mixing chamber; and
    vii. a baffle disposed between said common mixing chamber and said exit port, said baffle comprising a plurality of discs mounted on a central axle, the faces of said discs being disposed substantially at right angles to the direction of flow of the foam reaction mixture, said discs each having an aperture in the perimeter thereof to permit passage of foam reaction mixture therethrough.

4. A portable apparatus for mixing and dispensing a polymer foam reaction mixture according to claim 3 wherein the apertures in the discs of the baffle are so aligned that the foam reaction mixture is compelled to follow a tortuous path in passage through said baffle.